United States Patent [19]

Koop

[11] Patent Number: 5,118,155
[45] Date of Patent: Jun. 2, 1992

[54] FUEL FILLER POCKET

[75] Inventor: David A. Koop, Waterford, Mich.

[73] Assignee: Molmec, Inc., Walled Lake, Mich.

[21] Appl. No.: 681,984

[22] Filed: Apr. 8, 1991

[51] Int. Cl.$^5$ .............................................. B62D 27/04
[52] U.S. Cl. ................................ 296/1.1; 296/97.22;
220/86.2; 285/921
[58] Field of Search .......................... 296/97.22, 1.1;
220/85 F, 86.2, 307; 280/834, 853; 285/162,
194, 921

[56] References Cited

U.S. PATENT DOCUMENTS

| 4,142,756 | 3/1979 | Henning et al. | 296/97.22 |
| 4,448,323 | 5/1984 | Hayashi et al. | 220/86.2 |
| 4,573,694 | 3/1986 | Goto et al. | 280/834 |
| 4,998,642 | 3/1991 | Kraus | 220/307 |

FOREIGN PATENT DOCUMENTS

| 142934 | 1/1950 | Australia | 220/307 |
| 2405098 | 8/1975 | Fed. Rep. of Germany | 285/162 |

Primary Examiner—Dennis H. Pedder
Attorney, Agent, or Firm—Reising, Ethington, Barnard, Perry & Milton

[57] ABSTRACT

The invention relates to a fuel filler pocket adapted to be inserted within a vehicle side panel opening in a way to surround and support a fuel tank inlet tube and wherein the pocket includes integral resilient tangs for locking the pocket within the panel opening.

5 Claims, 2 Drawing Sheets

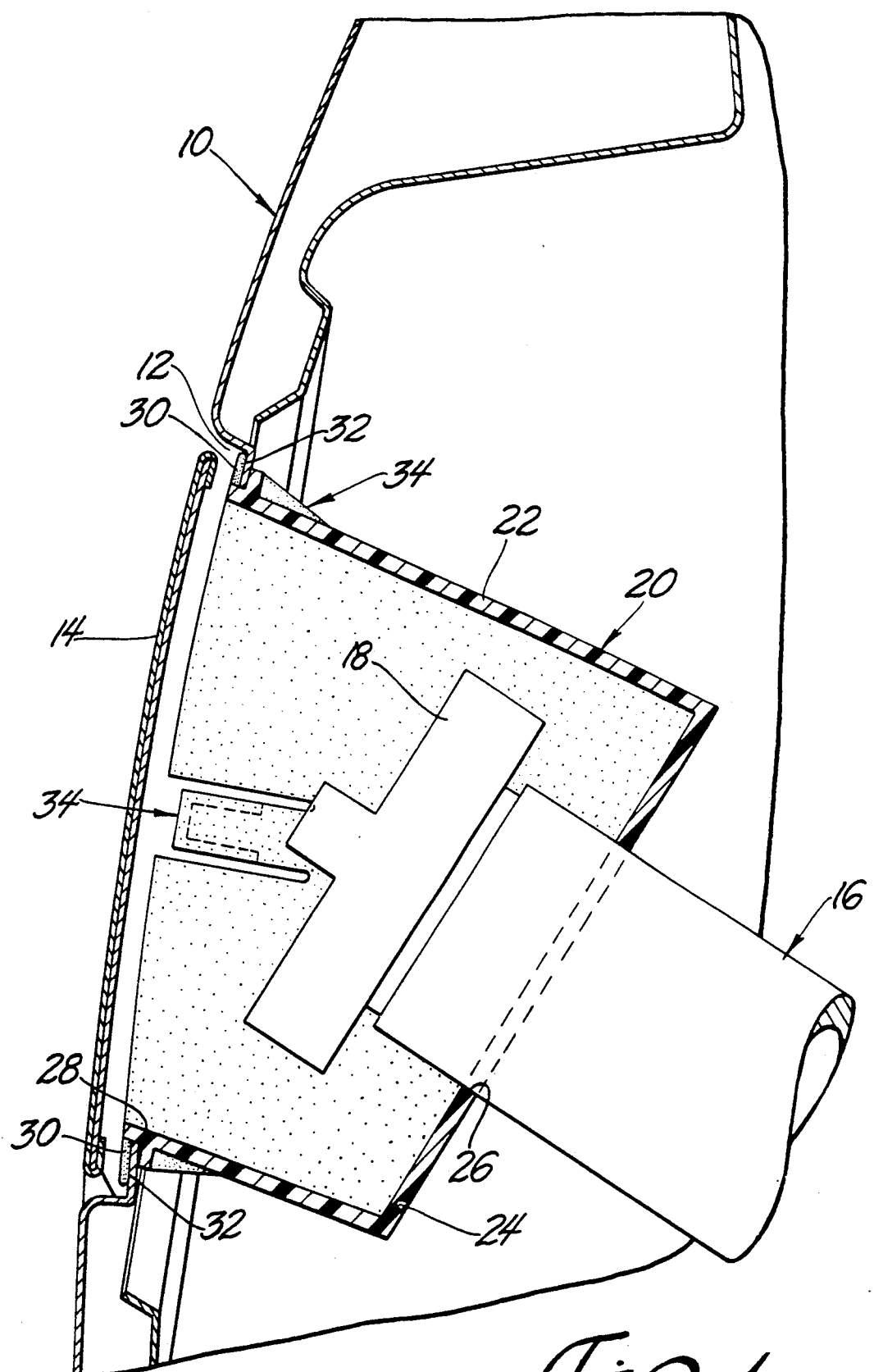

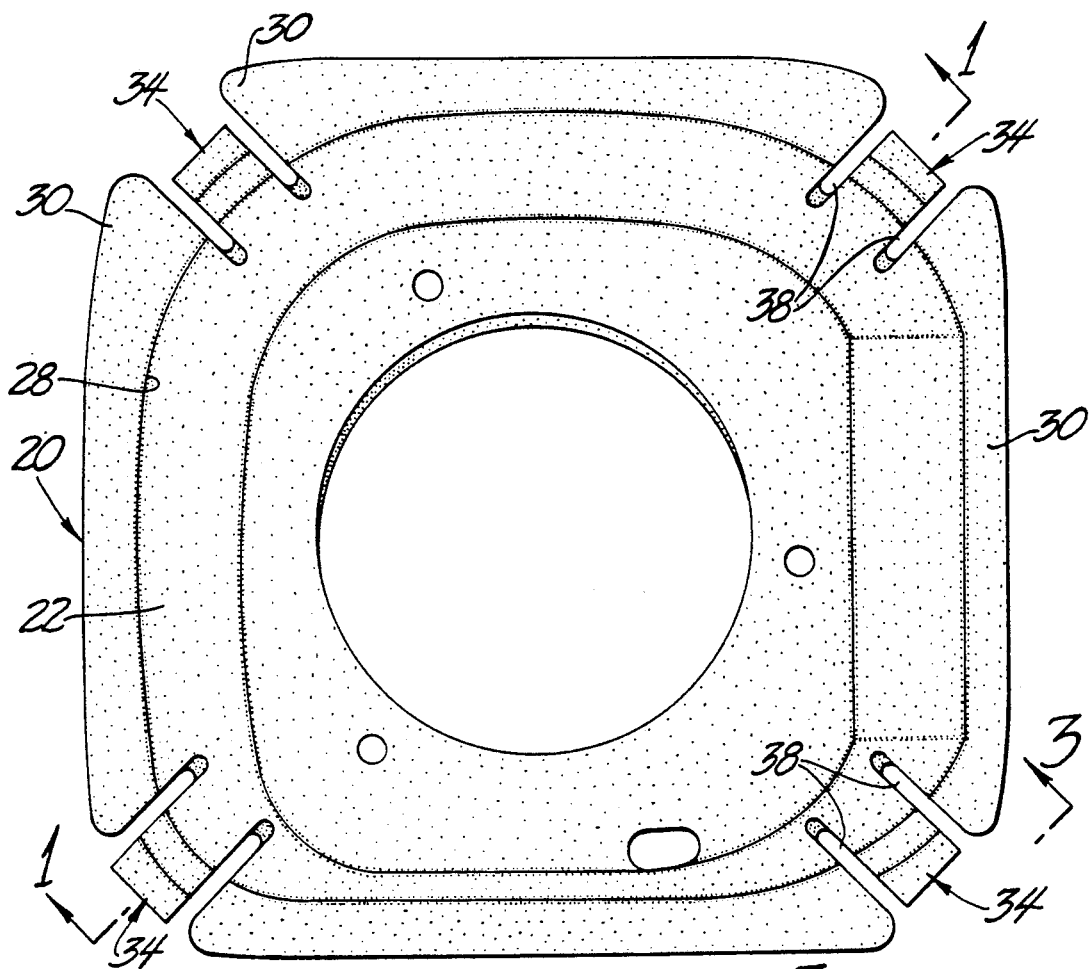

FUEL FILLER POCKET

BACKGROUND OF THE INVENTION

The present invention relates to a fuel filler pocket of the type adapted to project within an opening in a vehicle side panel so as to surround and support the filler end of a gas tank inlet tube. The vehicle side panel opening is normally enclosed by a hinged door to cover the end of the gas filler tube. The invention is particularly concerned with securing the pocket within the vehicle panel opening without the necessity of using screws or other separate fastener means. This objective is achieved by forming the pocket in such a way as to enable it to be snapped in place within the aforesaid panel opening.

PRIOR ART

Although applicant is unaware of any closely similar prior art patents, he is aware that it is known to provide such a pocket comprising an elongated body portion having an inner opening adapted to surround and support the gas tank inlet tube and which tube terminates in a gas cap disposed within the body portion. Said body portion including an outer opening laterally spaced from the inner and including a flange surrounding the outer opening and which flange is adapted to seat upon a recessed lip formed inwardly of the side panel and which flange and lip include aligned holes into which suitable screw or other fastener means are adapted to be inserted to secure the pocket within the panel opening. As noted, it is the purpose of the present invention to avoid the necessity for requiring screw or other such separate fastener means to secure the pocket within the side panel opening.

SUMMARY OF THE INVENTION

The present invention avoids the need for separate fastening means to secure the fuel filler pocket within the side panel opening. To achieve this end, the present invention utilizes a fuel filler pocket formed within integral tangs adapted to coact with a recessed lip of the side panel in such a way as to lock the pocket within the opening by the simple action of inserting the pocket within said opening.

More specifically, the present invention includes a fuel filler pocket adapted to project within an opening in a vehicle side panel so as to surround and support the filler end of a gas tank inlet tube. The pocket member includes an elongated body portion having an inner wall opening through which the tank inlet tube projects and which tube terminates in a filler gas cap disposed within the body portion. An outer opening is formed in the body portion and is laterally spaced from the inner opening and is adapted to be disposed proximate the side panel opening. The body portion includes an outwardly extending flange means surrounding the outer pocket opening. An inwardly recessed lip is formed about the side panel opening and the flange means is adapted to seat upon said lip when the pocket is fully inserted within the side panel opening.

The unique feature of the present invention is to provide a plurality of tangs peripherally spaced about the outer opening of the body portion and which tangs have an outer end which terminates generally flush with the flange means. Each tang includes a notched outer portion inwardly spaced from the flange mean and adapted to coact with the side panel lip to interlock with said lip in a way as to retain the pocket within the side panel opening.

More specifically, each tang includes an inclined or ramp portion adapted to progressively engage with the side panel lip to flex the tangs inwardly until the pocket is inserted within the opening so as to place the flange means and the lip in abutting relationship at which point the notched portion of the tang is aligned with the lip whereby tang flexes outwardly to lock the inclined portion of said tang behind the lip and lock the pocket in its fully inserted position.

The means by which the above stated objects and advantages are realized will be clearly understood from the following description of a preferred embodiment thereof selected for the purposes of illustration and having reference to the drawings wherein:

BRIEF DESCRIPTION OF THE DRAWINGS

FIG. 1 is a sectional view through a vehicle side panel showing the fuel filler pocket of the invention mounted therein.

FIG. 2 is a plan view of the fuel filler pocket.

FIG. 3 is a side elevation along line 3—3 of FIG. 2.

FIGS. 4 and 5 are respectively sectional views along lines 4—4 and 5—5 of FIG. 3.

DESCRIPTION OF A PREFERRED EMBODIMENT

As best seen in FIG. 1 of the drawings, a vehicle side panel is indicated generally at 10 and includes an opening 12 normally disposed in the rear quarter panel of the vehicle so as to be proximate fuel tank not shown. Panel opening 12 is normally enclosed by a hinged cover indicated generally at 14 to hide the fuel tank inlet tube or pipe indicated generally at 16. The filler tube includes an outer end adapted to receive a conventional filler cap 18 which closes the outer end of the inlet tube.

A filler pocket is generally indicated at 20 and is adapted to surround and support the outer end of the gas tank filler tube 16 such that the gas cap 18 is disposed inwardly proximate the side panel cover 14. The exact configuration of the fuel filler pocket 20 will be determined by the body style and the angle at which the fuel inlet tube approaches the vehicle side panel 10. In the present invention, the pocket 20 includes an elongated body portion 22 having an inner wall 24 formed with an opening 26 generally corresponding in size with the diameter of the fuel tank inlet tube 16 and in order that the opening and inner wall surround and support the outer end portion of the tube.

The outer end of body portion 22 defines a larger outer opening 28 laterally spaced from the inner wall opening 26 and which outer end terminates in laterally outwardly extending flange portions 30. The side panel opening includes an inwardly recessed lip 32 which projects laterally inwardly and is generally parallel to the side panel 10. The pocket 20 is adapted to be inserted within the side panel opening to such an extent that the outwardly extending flange portions 30 abut against the panel lip 32. It is the tang means for locking or retaining the pocket within the panel opening that is the subject matter of the invention.

While pocket 20 may be formed of a variety of materials, it is preferred to mold such pocket of a plastic material such as glass filled nylon. The gauge or thickness of the walls of the pocket are approximately .08 inch.

The means for securing the pocket within the panel opening includes a plurality of tangs 34 formed about the periphery of the body portion 22 of the pocket. The outermost or free ends 36 of the tangs are disposed generally flush with the flange portions 30. As best seen in FIG. 3, each tang is formed by a plurality of spaced slots 38 formed in pocket body portion 22 and with the open end of the slots terminating at flange portions 30. While the precise length of the slots may vary, they must be long or deep enough that the tang is able to flex relative to the surrounding body portion 22 of the pocket. Each tang 34 is formed in a way as to be able to coact with the panel opening lip 32 to lock the pocket within the panel opening when the pocket flange 30 is generally in abutting relationship with lip 32. The preferred way of achieving such a locking relationship is to form each tang with a tapered portion 40 formed on the outside surface of the main portion 42 of the tang. The inclined or tapered portion 40 begins proximate the bottom end of the slots 38 and progressively inclines outwardly toward the free end 36 of the tang. The outermost or widest end of incline portion 40 terminates below and is longitudinally inwardly spaced from both the outermost end 36 of the tang and the flange portion 30. In this way the outer most portion of the inclined portion forms a notch 44 as best seen in FIGS. 3–5.

The manner in which the tangs 34 lock with the panel opening lip 32 will now be described. When the pocket 20 is inserted within the side panel opening 12 the inclined portion 40 of each tang will progressively engage panel lip 32 causing the tang to be flexed inwardly relative to body portion 22 of the pocket until the insertion movement brings the pocket flange 30 into abutting relationship with the pane lip 32. At this point, the lip projects within tang notch 44 enabling the tang to flex outwardly and causing the outer end of the incline to lock beneath the lip and to thereby retain the pocket within the side panel opening. In this way it is possible to avoid the use of any other fastening devices to retain the pocket within the panel opening as has been required with previous devices. Thus, both the cost of fasteners is eliminated as well as the time necessary to install such fasteners.

In the illustrated form of the invention shown, four tangs are utilized. However, the number of tangs can be varied and it would be possible to use as few as one tang to provide the locking function. On the other hand, it is most preferred that there be at least two symmetrically disposed tangs in order that the locking function be balanced around the periphery of the pocket.

Other modifications of the invention are possible within the intended scope of the invention as set forth in the hereinafter appended claims.

What is claimed is:

1. A fuel filler pocket (20) of the type adapted to project within an opening (12) in a vehicle side panel (10) to surround and support the filler end of a gas tank inlet tube (16), said pocket comprising an elongated body portion (22) having an inner wall (24) and opening (26) through which the gas tank inlet tube projects and which tube includes an outer end which terminates within said body portion, the body portion (22) includes an outer opening (28) longitudinally spaced from the inner opening and adapted to be disposed proximate the side panel opening, flange means (30) formed on said body portion and surrounding the outer pocket opening (28), an inwardly recessed lip (32) formed about the side panel opening, said flange means being adapted to seat upon and be secured to the lip, the improvement comprising: a plurality of flexible tang means (34) formed in the pocket body portion (22), the outermost end (36) of each tang means terminates proximate the flange means (30), each tang means includes a generally flat main portion (42) and a tapered portion (40) adapted to coact with the panel lip to lock the pocket within the side panel opening when the flange means abut against the lip.

2. A fuel filler pocket as set forth in claim 1 wherein each tang means (34) is defined by a pair of slots (38) formed in the pocket body portion and extending from the outer opening (28) toward the inner opening, the lip-coacting portion (40) of the tang means being adapted to progressively engage with the lip to flex the tang means laterally inwardly as the pocket member is inserted within the panel opening.

3. A fuel filler pocket member as set forth in claim 2 wherein the lip-engaging tapered portion (40) of the tang means progressively inclines laterally outwardly from the main portion (42) and terminates in an end spaced laterally outwardly on the main portion, said end being longitudinally inwardly spaced from the outermost end (36) of said tang means and thereby defining therewith a notch (44), said lip adapted to extend within said notch and retain the pocket within the panel opening when the pocket flange means abut against said lip.

4. A fuel filler pocket as set forth in claim 2 wherein the tang means include a main portion (42) normally flush with an adjacent body portion of the pocket, the lip-coacting portion (40) of the tang means being formed on of said main portion and being longitudinally spaced from an outermost end (36) of the main portion and to form therewith a notch (44) said notch adapted to be laterally aligned with said panel lip (32) when the body portion flange means (30) abut against said lip whereby said tang can flex outwardly to lock the lip-coacting portion of the tang means beneath said lip.

5. A fuel filler pocket as set forth in claim 1 wherein said plurality of tang means includes at least two tangs symmetrically spaced about the outer opening (28) of said pocket body portion.

* * * * *